Aug. 15, 1933.   H. S. HOUGLUM   1,922,133
WINDSHIELD HEATER FOR MOTOR VEHICLES
Filed Dec. 22, 1932   3 Sheets-Sheet 1
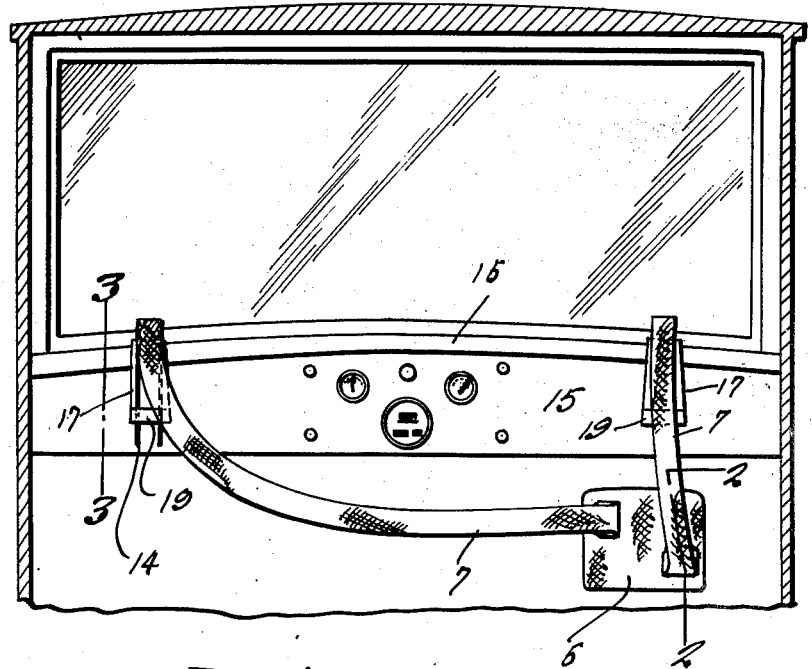
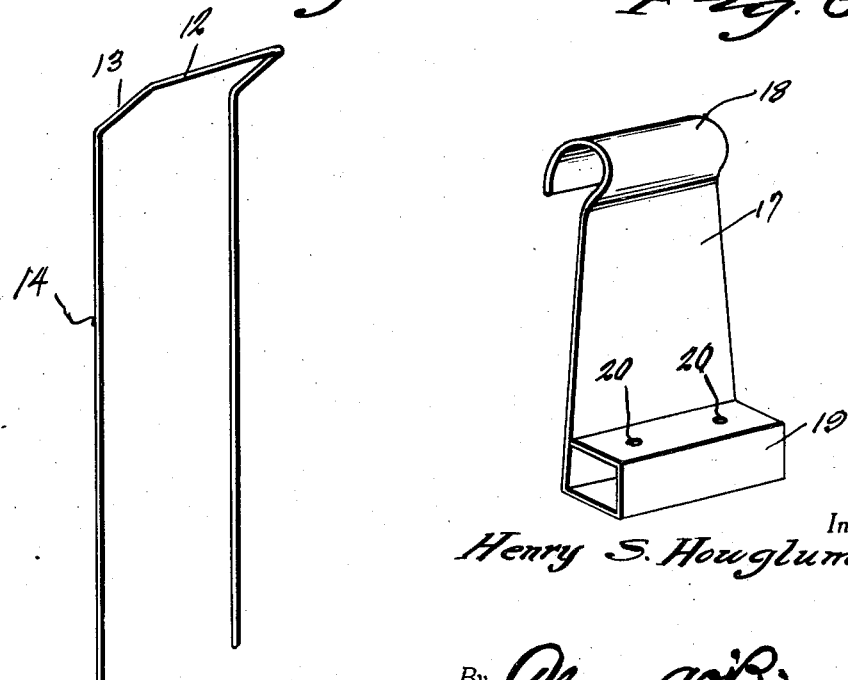
Inventor
Henry S. Houglum
By Clarence A. O'Brien
Attorney Aug. 15, 1933.  H. S. HOUGLUM  1,922,133
WINDSHIELD HEATER FOR MOTOR VEHICLES
Filed Dec. 22, 1932  3 Sheets-Sheet 2

Inventor
Henry S. Houglum

By Clarence A. O'Brien
Attorney

Aug. 15, 1933.   H. S. HOUGLUM   1,922,133
WINDSHIELD HEATER FOR MOTOR VEHICLES
Filed Dec. 22, 1932   3 Sheets-Sheet 3
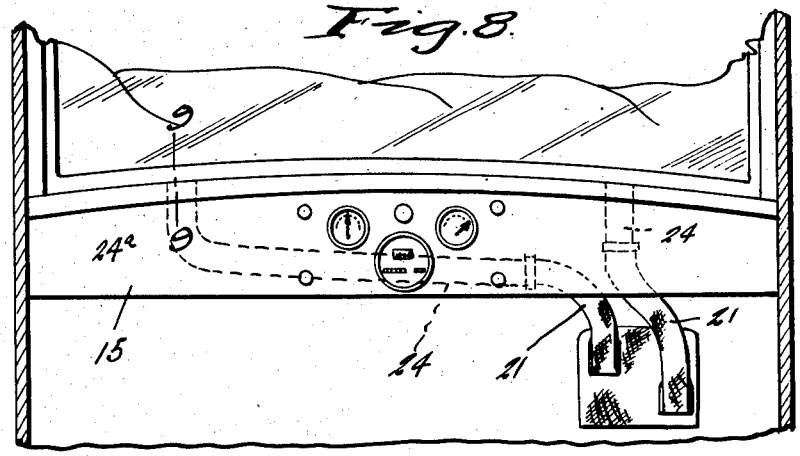
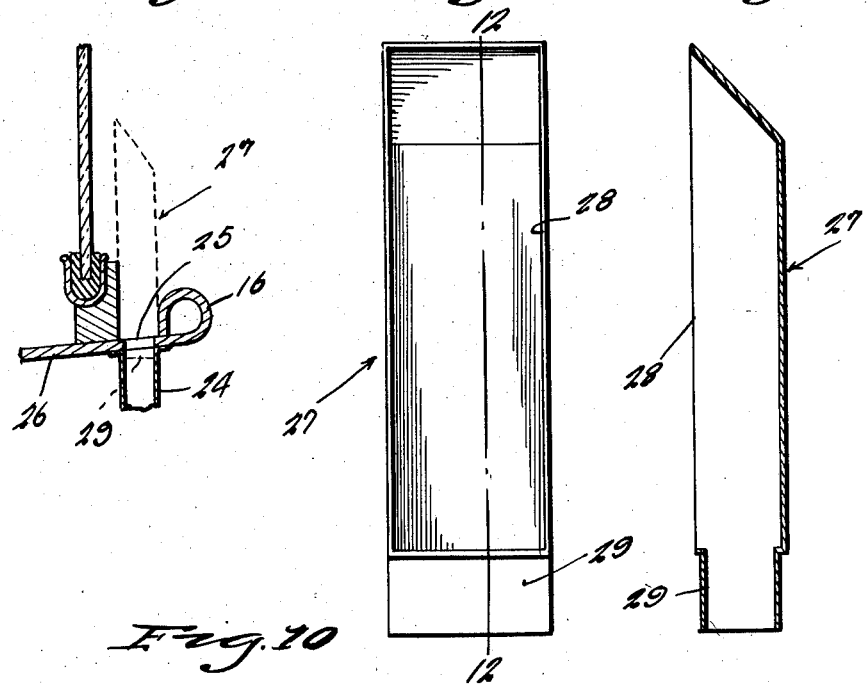
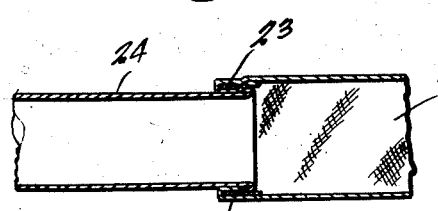
Inventor
Henry S. Houglum
By Clarence A. O'Brien
Attorney Patented Aug. 15, 1933

1,922,133

UNITED STATES PATENT OFFICE 1,922,133

WINDSHIELD HEATER FOR MOTOR VEHICLES

Henry S. Houglum, Moorehead, Minn.

Application December 22, 1932
Serial No. 648,481

7 Claims. (Cl. 20—40.5)

This invention relates to windshield heaters. It is well known, that during the winter months, and very often, during the spring months in far northern countries the accumulation of snow and ice on the windshield of a motor vehicle is of regular occurrence, and is not only annoying to the driver of the vehicle, making it very difficult or impossible for him to see ahead through the windshield but is often the cause of numerous accidents, resulting in many instances, in fatal injury, especially as to the occupants of motor vehicles.

A number of devices have been proposed for overcoming the above noted difficulty, but such devices are usually unsatisfactory in use or expensive to manufacture.

It is therefore an object of the present invention to provide a device for the purpose above mentioned which is extremely simple in construction, thoroughly efficient in use, inexpensive to manufacture, and can be installed within a minimum amount of time.

Other objects of the invention are to provide a device which will not be unsightly in appearance, and which, when not in use, can be stored in a convenient place in the vehicle, the device being of such a size to require but a minimum amount of storage space.

Other objects and advantages will be best understood from a study of the following description, taken in connection with the accompanying drawings wherein:

Figure 1 is a fragmentary vertical sectional view through the front part of the interior of an automobile, showing the application of one form of the invention.

Figure 6 is a perspective view of a bracket.

Figure 7 is a perspective view of a supporting frame.

Figure 8 is a view somewhat similar to Figure 1 showing the application of a slightly modified form of the invention.

Figure 9 is a sectional view taken substantially on the line 9—9 of Figure 8, a nozzle member being suggested by dotted lines.

Figure 10 is a fragmentary longitudinal sectional view showing the manner of connecting one of the flexible tubes with a heat conductor pipe.

Figure 11 is a front elevational view of a nozzle, and

Figure 12 is a longitudinal sectional view taken substantially on the line 12—12 of Figure 11.

Figure 2:
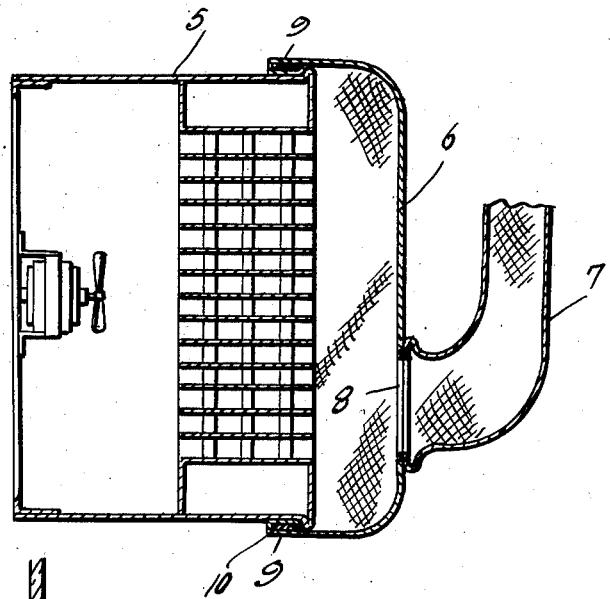
Figure 2 is a detail sectional elevational view taken substantially on the line 2—2 of Figure 1.

Referring to the drawings by reference numerals reference is first had to Figures 1 to 7 inclusive, wherein is illustrated one form of the invention for use in connection with a conventional type of vehicle heater designated generally by the reference character 5.

In accordance with the present invention there is provided for the heater 5, hood 6 that is preferably made of very light weight material of a construction or weave that will allow sufficient heat to pass therethrough to the interior of the vehicle. At the edge thereof, the hood or cover 6 is provided with a hem 9 in which is arranged an elastic band 10 for contracting the hood in a manner to hold the same in place. As is obvious the hood may be readily positioned on the heater by slipping the open end of the hood over the heater 5.

Associated with the hood 6 are flexible tubes 7, preferably made of very light weight, airtight material. The tubes 7 at one end are suitably attached to the hood 6 in line with opening 8 provided in the hood. For supporting the free end of the tubes 7 in operative position to the windshield there are provided brackets 17, each of which consist of a plate formed at its upper end to provide a hook 18 to engage over the bead or flange 16 usually forming part of the cowl construction of the vehicle. At its lower end the body of the bracket is formed to present a box like formation 19, the upper and lower portions of which are provided with openings 20.

For association with the bracket 17 are supporting frames, and as shown to advantage in Figure 7, each of the supporting frames is formed from a single length of wire bent into a substantial U, and having the sides 14 of the U, adjacent the closed end 12 of the U bent in a manner to provide angularly disposed portions 13.

Figure 3:
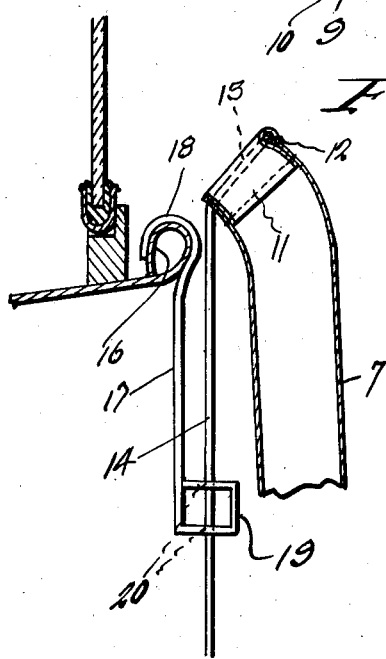
Figure 3 is a detail sectional view taken substantially on the line 3—3 of Figure 1.
Figure 4:
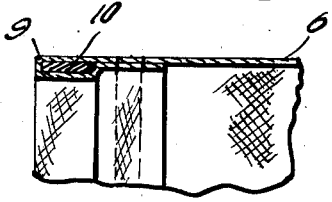
Figure 4 is an enlarged detail sectional view through the hood showing the elastic band in the hem thereof.
Figure 5:
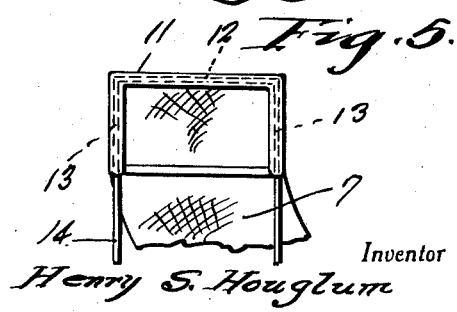
Figure 5 is an end elevational view of one of the tubes, a supporting frame for the end of the tube being shown fragmentarily.

As shown in Figures 3 and 5 the free ends of the tubes or conductors 7 are provided with hems 11 and arranged in the hems 11 of the tubes are the portions 12 and 13 of the supporting brackets in a manner to hold said free ends of the tubes open or expanded, and in such a position relative to the windshield as to direct the heated air thereagainst.

The sides or legs 14 of the supporting brackets frictionally extend through the openings 20 in the brackets 17 so that the frames may be adjusted vertically for the purpose of positioning the discharge ends of the tubes 7 at the desired position with relation to the windshield.

In the form of the invention shown in Figure 8 the tubes or conductors 21, corresponding to the tubes or conductors 7 of the form of the invention shown in Figure 1 are of less length than the conductors 7; and also, at their free ends are provided with hems 22 in which are arranged elastic bands 23.

As also shown in Figure 8 there are suitably mounted behind the instrument board 15 heat conducting tubes 24. The tubes 24 may be formed of metal or from any other suitable material and are fixedly secured in position, and since they are in an out of the way position, will not detract from the appearance of the vehicle and consequently the likelihood of any occasion arising that may require their removal, is very remote. As shown, one of the tubes 24 is disposed vertically and is relatively short, while the other of the tubes 24 is disposed at an incline and has an upwardly curved end 24a. The upper end of the short tube 24, as well as the end 24a of the longer tubes aline with openings 25 provided in the cowl 26 between the windshield frame and the bead 16 as clearly shown in Figure 9.

As also shown in Figure 8 the free ends of the tubes 21 are slipped over the free ends of the tubes 24, and as suggested in Figure 10, the free ends of the tubes 21 are, through the medium of the elastic bands 23 contracted about the tubes 24 for holding said ends of the tubes 21 on the tubes 24.

In the form of the invention shown in Figure 8 it is to be noted that only a small portion of the tubes 21 is exposed to view, and obviously this latter form of the invention will, because of the minimum number of parts involved, will be oftentimes preferable to the form of the invention shown in Figure 1.

For use in conjunction with the tubes 24, I provide nozzles 27. The purpose of the nozzles is to provide for the directing of the heated air on to the windshield at a point higher than would be the case if the nozzles were dispensed with.

Each of the nozzles 27 consist of a box like body of metal or other suitable material having an open side 28 for disposition toward the windshield. At their lower ends the nozzles 27 are provided with restricted necks 29 adapted to pass through the openings 25 and to telescope within the ends of the tubes 24 alined with said openings 25 as will be clear from a study of Figure 9.

Even though I have herein shown and described the preferred embodiments of the invention, it is to be understood that the same is susceptible of further changes, modifications and improvements coming within the scope of the appended claims.

Having thus described my invention, what I claim as new is:

1. A device for applying heated air to a windshield comprising a flexible hood provided with elastic means for securing it to a heater, flexible tubes connected at one end with the hood, supporting frames for the free ends of the tubes and having portions connected with the tubes in a manner to retain the free ends of the tubes in open position, and bracket means engageable with said frames for supporting the same adjacent to the windshield.

2. As a new article of manufacture, a hood member comprising a piece of fabric provided with a hem at its marginal edge, an elastic band arranged in said hem, said piece being also provided with apertures, and fabric tubes united at one end with the fabric piece in line with said apertures.

3. In a device of the character described, a flexible hood provided with elastic means for securing it on a heater, flexible tubes secured at one end to the hood, supporting frames secured to the free ends of the tubes and brackets adjustably associated with the frames and having apertured portions for receiving the sides of the frames, said brackets also having means for securing the same in operative position to a windshield.

4. In a motor driven vehicle, the combination with an instrument board, a cowl and a heater, of a flexible hood provided with means for securing it in operative position on the heater, flexible tubes secured at one end to the hood, relatively rigid heat conducting tubes supported behind said instrument board and having ends alined with openings in said cowl and said flexible tubes having free ends adapted to be slipped over the free ends of the rigid tubes.

5. In a motor driven vehicle, the combination with an instrument board, a cowl and a heater, of a flexible hood provided with means for securing it in operative position on the heater, flexible tubes secured at one end to the hood, relatively rigid heat conducting tubes supported behind said instrument board and having ends alined with openings in said cowl and said flexible tubes having free ends adapted to be slipped over the free ends of the rigid tubes, and nozzle members for the rigid tubes extending upwardly from said cowl in operative position relative to the windshield.

6. In a motor driven vehicle, the combination with an instrument board, a cowl and a heater, of heat conducting tubes fixedly mounted behind said instrument board and having ends alined with openings in said cowl, conducting means operatively connecting said tubes with said heater, and a nozzle for each of said tubes comprising a box like structure open at one side and provided at one end with a neck adapted to be passed downwardly through an opening in the cowl for telescopic engagement with the end of the tube alined with said opening.

7. As a new article of manufacture, a fabric hood having an open side adapted to be contracted about the casing of a heater for securing the hood to the heater, and a fabric heat conducting tube united at one end thereof with said hood.

HENRY S. HOUGLUM.